US011658976B2

(12) United States Patent
Singhvi et al.

(10) Patent No.: US 11,658,976 B2
(45) Date of Patent: May 23, 2023

(54) CAPTIVE PORTAL REDIRECTION AND NETWORK ACCESS RESTRICTION OF DEVICE USING A SINGLE ACCESS CONTROL LIST

(71) Applicant: Arista Networks, Inc., Santa Clara, CA (US)

(72) Inventors: Manish Singhvi, Rajasthan (IN); Ganesan Rajagopal, Bangalore (IN); Ziqian Xu, Milpitas, CA (US); Leandro Penz, Dublin (IE)

(73) Assignee: ARISTA NETWORKS, INC., Santa Clara, CA (US)

( * ) Notice: Subject to any disclaimer, the term of this patent is extended or adjusted under 35 U.S.C. 154(b) by 22 days.

(21) Appl. No.: 17/199,513

(22) Filed: Mar. 12, 2021

(65) Prior Publication Data

US 2022/0239654 A1 Jul. 28, 2022

(30) Foreign Application Priority Data

Jan. 27, 2021 (IN) .............................. 202141003603

(51) Int. Cl.
*G06F 21/62* (2013.01)
*H04L 9/40* (2022.01)
(Continued)

(52) U.S. Cl.
CPC ........ *H04L 63/101* (2013.01); *H04L 63/0245* (2013.01); *H04L 63/0876* (2013.01); *H04L 63/20* (2013.01)

(58) Field of Classification Search
None
See application file for complete search history.

(56) References Cited

U.S. PATENT DOCUMENTS

2005/0076138 A1* 4/2005 Sterne .................... H04L 45/60
709/238
2008/0034407 A1* 2/2008 Sauter ................ H04L 63/0272
726/4

(Continued)

OTHER PUBLICATIONS

CN 106453409. English Translation. (Year: 2019).*

(Continued)

*Primary Examiner* — Venkat Perungavoor
(74) *Attorney, Agent, or Firm* — Sprinkle IP Law Group (57) ABSTRACT

Embodiments of a method for redirecting, by a network device, a host to a captive portal are disclosed. The method includes receiving an incoming frame originating from the host. The incoming frame has a payload specifying information associated with an external server. A user of the host has not been authenticated by the captive portal at a time when the incoming frame is received by the network device. The network device matches at least a portion of the incoming frame to a custom redirect rule of a unified access control list (ACL) implemented by the network device. In response to the matching, the network device forwards the incoming frame towards an internal redirection server executing on the network device. The network device receives a redirection frame from the internal redirection server. The payload of the redirection frame is generated by the internal redirection server using at least a portion of the incoming frame. The redirection frame is transmitted towards the host.

16 Claims, 6 Drawing Sheets

(51) Int. Cl.
    *H04L 12/903*     (2013.01)
    *H04L 12/859*     (2013.01)

(56) References Cited

U.S. PATENT DOCUMENTS

| | | | |
|---|---|---|---|
| 2009/0300759 A1* | 12/2009 | Wang | H04L 63/1458 |
| | | | 726/22 |
| 2014/0032591 A1* | 1/2014 | Li | H04L 63/0236 |
| | | | 707/769 |
| 2017/0339124 A1* | 11/2017 | Karlsson | H04L 63/101 |
| 2018/0176218 A1* | 6/2018 | Moreno | H04L 63/0815 |
| 2019/0190828 A1* | 6/2019 | Yuan | H04L 45/54 |
| 2020/0007547 A1* | 1/2020 | Valiquette | H04L 63/20 |
| 2020/0036717 A1* | 1/2020 | Akella | H04L 12/4633 |
| 2020/0162517 A1* | 5/2020 | Wong | H04W 12/12 |
| 2022/0239701 A1* | 7/2022 | Karasaridis | H04L 63/0876 |

OTHER PUBLICATIONS

Implementation of OpenWrt-based IP PnP Gateway. Lee. ACM. (Year: 2008).*

Capability-based egress network access control by using DNS server. Suzuki. Elsevier. (Year: 2007).*

A Design of Egress NAC using an Authentication Visa Checking mechanism to Protect against MAC Address Spoofing Attacks. Puangpronpitag ECTI. (Year: 2011).*

* cited by examiner

Exemplary Unified ACL

ACL Name: ip access-list unifiedacl

ACL Rules:
10 permit ip any captiveportal1.com
20 permit ip any captiveportal2.com
30 permit ip any intranetwebsite1.com
40 permit ip any <ip2>
50 permit udp any any 53,67
60 deny tcp any any eq www copy captive-portal
70 deny ip any any

FIG. 4B

CAPTIVE PORTAL REDIRECTION AND NETWORK ACCESS RESTRICTION OF DEVICE USING A SINGLE ACCESS CONTROL LIST

BACKGROUND

Network devices (e.g., switches) include functionality to enable a user (via a host) to access external servers operatively connected to the network devices over a network. In certain scenarios, a user needs to be authenticated prior to the network device(s) permitting the user to access the external servers.

BRIEF DESCRIPTION OF DRAWINGS

FIGS. 4A-4B shows an example in accordance with one or more embodiments of the disclosure. More specifically.

DETAILED DESCRIPTION

Web authentication is now common practice particularly given privacy concerns among other reasons. Internet infrastructure, such as network devices, have had to keep up with newly adopted methods of device and user authentication. In certain scenarios, for the purpose of security, web authentication requirements need to be satisfied prior to granting access to the entire network. The IEEE 802.1X industry-adopted protocol, for example, requires user authentication prior to granting the user access to certain websites; otherwise, all but a select number of internal websites are considered off-limits to an unauthenticated user.

Network devices employ access control lists (ACLs), e.g., ordered lists of rules that define the manner in which a frame is processed by the network device. For example, the network device may implement ACL rules to forward frames that match all commands in an ACL permit-type rule; drop frames that match all conditions in a deny-type rule; or drop frames that do not match any ACL rules. ACL rules may directly or indirectly serve other interface restriction purposes. For example, ACL permit and deny type rules may be employed to infer redirection of a frame to obtain a captive portal uniform resource locator (URL).

To implement web authentication, currently, network devices employ multiple ACLs. An access restriction ACL defines certain permissions and denials of frames on an interface and a redirection ACL provides frame redirection instructions on the interface but only by way of inference using permit/deny types of rules. Management of multiple ACLs is not an easy task and leaves room for errors arising from attempts to implement conflicting rules. For example, in an access restriction ACL, a port may be programmed to deny traffic whereas the same port may be programmed to allow traffic in a redirection-inferred ACL. Moreover, while an access restriction ACL might be provided by an authentication server at the outset of a web authentication session, a system administrator is typically required to provide the redirection rules in a separate and distinct ACL. This traditional process also does not lend itself to automation. Moreover, multiple ACLs must be eventually merged before the rules of all ACLs are applied, a cumbersome and inefficient effort, typically performed by a network device, that burdens the device with unnecessary overhead to perform the aforementioned merging.

In order to address one or more of the aforementioned limitations related to the traditional use of ACLs for redirection, a network device (e.g., a switch) is provided with a unified ACL, which implements a redirection functionality within the ACL framework by enhancing the ACL grammar to natively include a redirection option without the need to merge with a separate redirection ACL and that enables a frame to be redirected to the kernel of the network device for further processing.

Various embodiments of the disclosure are described below.

Figure 1:
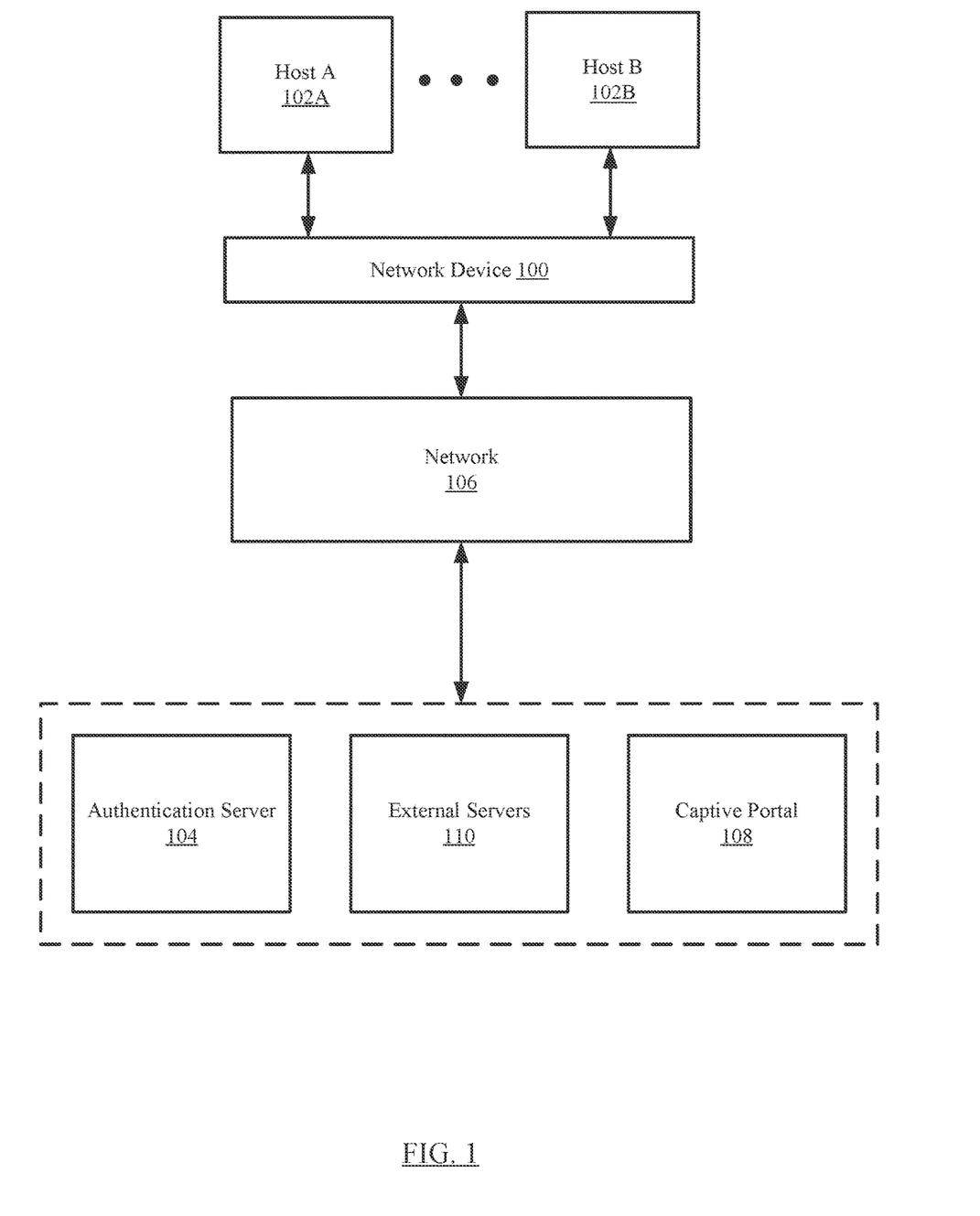
FIG. 1 shows an example system in accordance with one or more embodiments of the disclosure.

FIG. 1 shows an example system in accordance with one or more embodiments of the disclosure. The system includes a network device (100) communicatively coupled to one or more hosts (102A, 102B), a network (106), an authentication server (104), one or more external servers (110) and a captive portal(s) (108). Network device (100) is operationally coupled to captive portal (108) and an external server(s) (110) through network (106). Network device (100) is further operationally coupled to authentication server (104). Further, the captive portal (108) and the authentication server (104) are directly or operationally coupled. Each of these components is described below.

In one embodiment of the disclosure, the captive portal (108) and the authentication server (104) may be co-located. For example, the captive portal (108) may be part of, in direct communication with, or in operational communication with the authentication server (104).

In one embodiment of the disclosure, the network device (100) may be one or more computing devices functionally equipped to process a frame by facilitating implementation of a unified ACL to achieve redirection of a HTTP[S] request to a captive portal.

In one embodiment of the disclosure, the network device (100) is a physical or virtual device that may be used for performing various embodiments of the disclosure. The physical device may correspond to any physical system with functionality to implement one or more embodiments of the disclosure. For example, the physical device may be a switch (i.e., a device with at least one or more processor(s), memory, and an operating system) that is directly (or operatively, e.g., via the network) connected to at least one host (e.g., 102A, 102B), an authentication server (e.g., 104), and to a captive portal (e.g., 108), and an external server(s) (e.g., 110). In another embodiment, the network device (100) is a physical device that includes persistent storage, memory (e.g., random access memory), one or more processor(s), and two or more physical ports that may be a combination of ingress and egress ports.

Alternatively, the physical device may be a special purpose computing device that includes one or more application-specific processor(s) (or hardware) configured to only execute embodiments of the disclosure. In such cases, the physical device may implement embodiments of the disclosure in hardware as a family of circuits and may retain limited functionality to receive input and generate output in accordance with various embodiments of the disclosure. In addition, such computing devices may use a state-machine to implement various embodiments of the disclosure.

In another embodiment of the disclosure, the physical device may correspond to a computing device that includes one or more general purpose processor(s) and one or more application-specific processor(s) (or hardware). In such cases, one or more portions of the disclosure may be implemented using the operating system and general purpose processor(s), while one or more portions of the disclosure may be implemented using the application-specific processor(s) (or hardware).

In one embodiment of the disclosure, the network device (100) includes executable instructions (stored in a non-transitory computer readable medium (not shown)), which when executed, enable the network device (100) to perform one or more methods described below (see e.g., FIGS. 3, 4A, 4B). Additional detail about the network device is described below with respect to FIG. 2.

Figure 3:
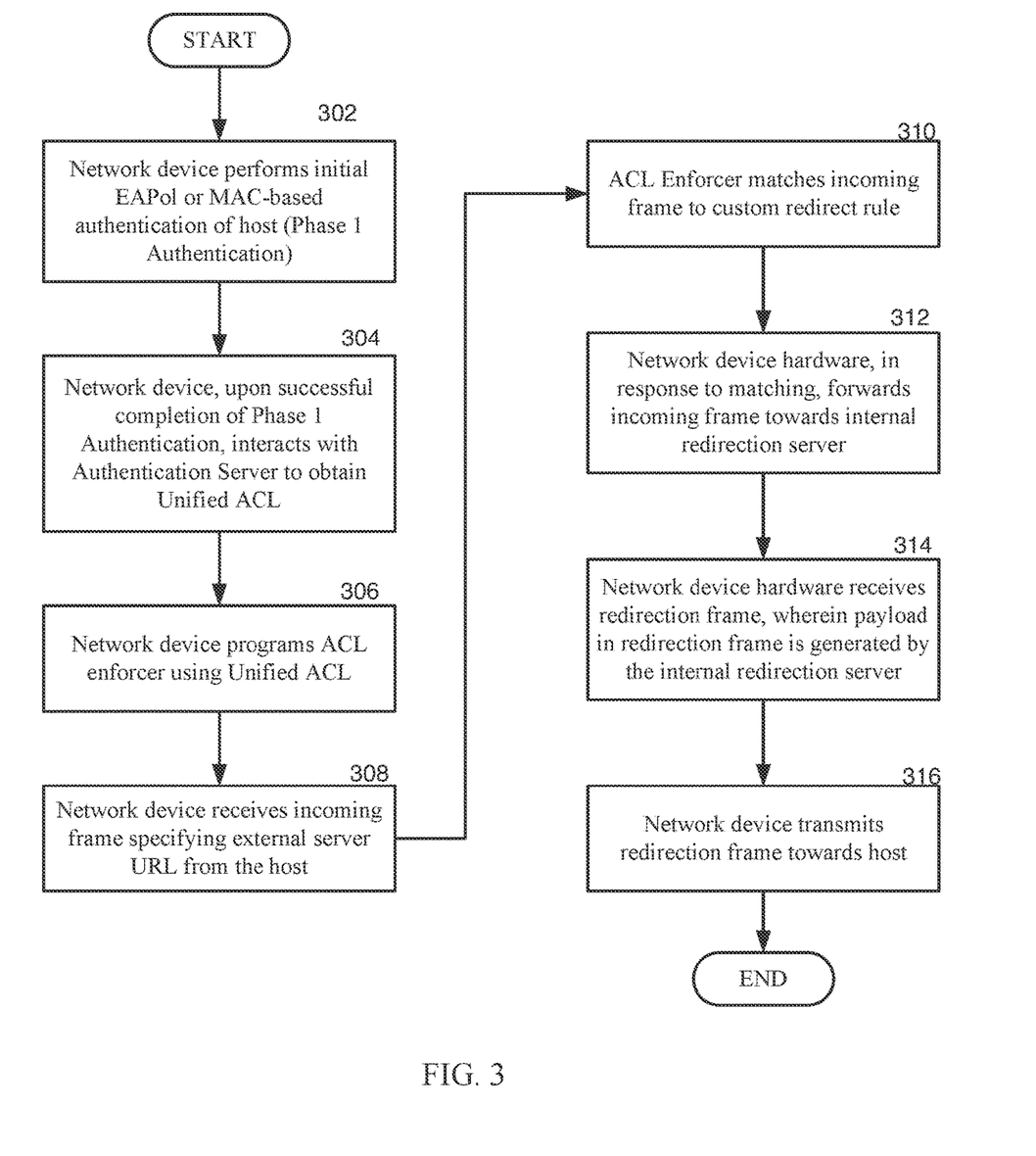
FIG. 3 shows a method, performed by a network device, for processing an incoming request frame, redirecting the request to a redirection server, and transmitting a redirection frame towards a captive portal.
Figure 4A:
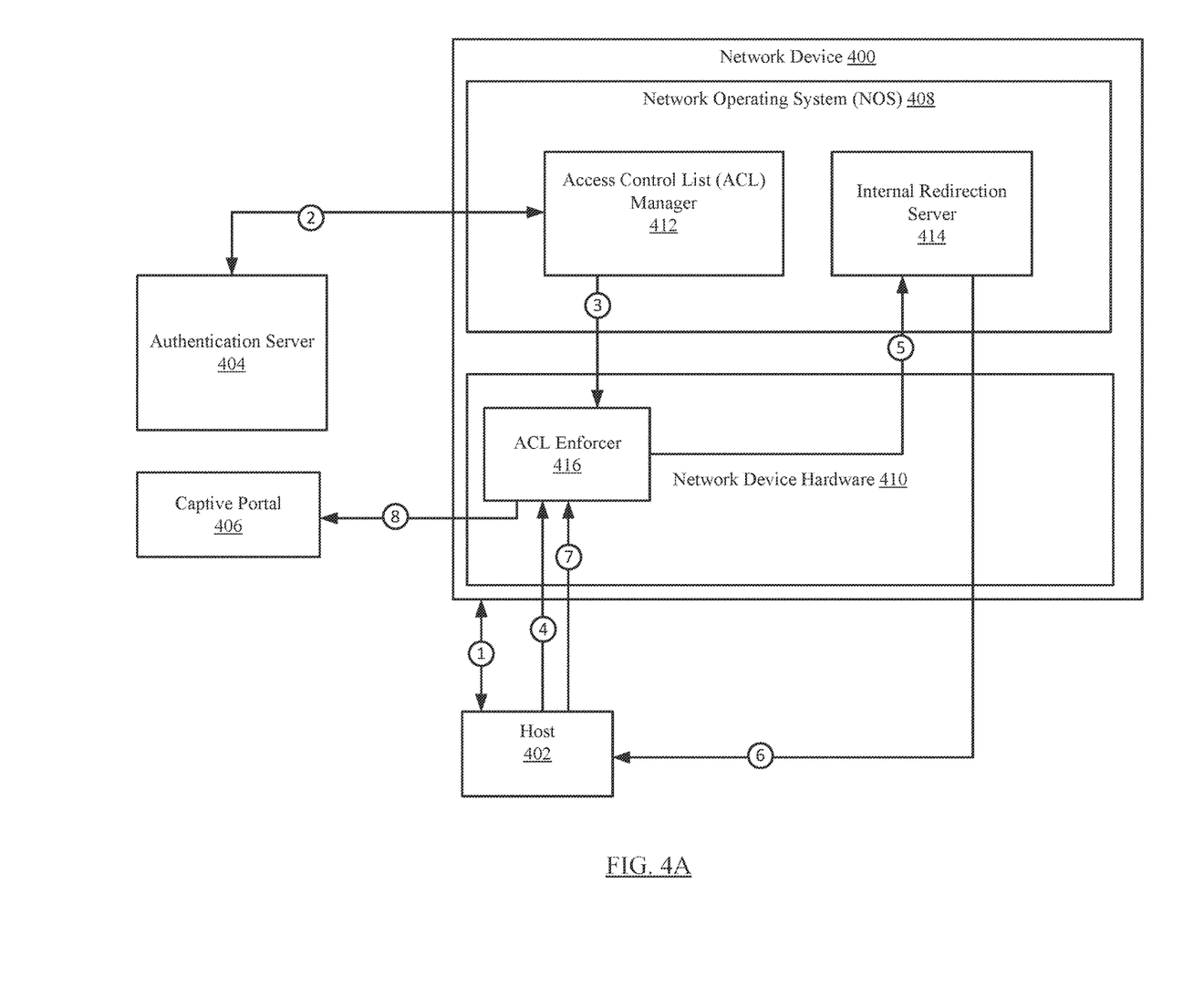
FIG. 4A shows an exemplary network device in accordance with one or more embodiments of the disclosure.
Figure 4B:
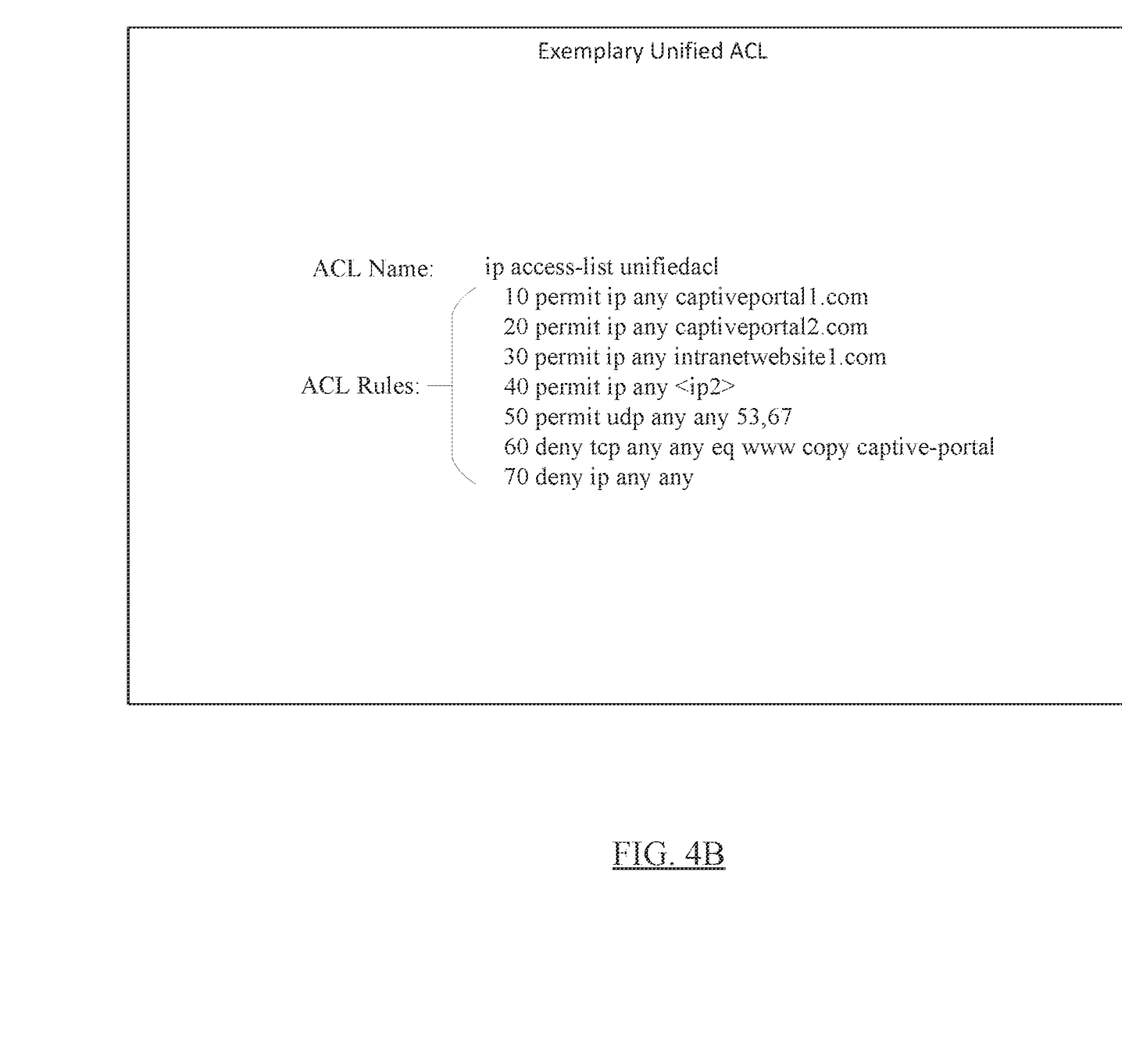
FIG. 4B shows an exemplary unified ACL in accordance with one or more embodiments of the disclosure.

In one embodiment of the disclosure, the persistent storage in the network device may include any type of non-transitory computer readable medium that includes instructions, which, when executed by one or more processor(s) in the network device, enable the network device to perform all or a portion of the functions described in accordance with one or more embodiments of the disclosure (see e.g., FIGS. 3-4B).

Examples of a network device include, but are not limited to, a router, a switch, and a multilayer switch. The network device is not limited to the aforementioned specific examples. Additional detail about a network device is described below with respect to FIG. 2.

In one embodiment of the disclosure, the network (106) may be the medium through which the network device (100), the hosts (102A, 102B), the authentication server (104), the captive portal (108), and the external server(s) (110) are operatively connected. In one embodiment of the disclosure, the network may include other network devices (or systems) (not shown) that facilitate communication between the aforementioned components. As such, in one embodiment of the disclosure, the network may include any combination of local and/or wide area (e.g., Internet) network segments that may be wire-based and/or wireless and that may use any combination of wired and/or wireless communication protocols.

In one embodiment, each of the hosts (e.g., 102A, 102B) may be one or more computing devices functionally equipped to transmit one or more HTTP[S] requests intended for one of the external servers (110) to ultimately achieve access to a network.

In one embodiment of the disclosure, each of the hosts (102A, 102B) is a physical or virtual device that may be used for facilitating performing various embodiments of the disclosure. The physical device may correspond to any physical system with functionality to implement one or more embodiments of the disclosure. For example, the physical device may be a personal computer, a laptop, a smartphone, or a tablet (i.e., a device with at least one or more processor(s), memory, and an operating system) that is directly or otherwise connected to a network device (100).

Alternatively, the physical device may be a special purpose computing device that includes one or more application-specific processor(s) (or hardware) configured to only execute embodiments of the disclosure. In such cases, the physical device may implement embodiments of the disclosure in hardware as a family of circuits and may retain limited functionality to receive input and generate output in accordance with various embodiments of the disclosure. In addition, such computing devices may use a state-machine to implement various embodiments of the disclosure.

In another embodiment of the disclosure, the physical device may correspond to a computing device that includes one or more general purpose processor(s) and one or more application-specific processor(s) (or hardware). In such cases, one or more portions of the disclosure may be implemented using the operating system and general purpose processor(s), while one or more portions of the disclosure may be implemented using the application-specific processor(s) (or hardware).

In one embodiment of the disclosure, each of the hosts (e.g., 102A, 102B) includes executable instructions (stored in a non-transitory computer readable medium (not shown)), which when executed, enable the corresponding host (e.g., 102A, 102B) to perform one or more methods described below (see e.g., FIGS. 3, 4A, 4B). Additional detail about the host is described below with respect to FIG. 5.

In one embodiment of the disclosure, a host may include functionality for storing commands obtained from internal or external application(s) for transmission of HTTP[S] requests to a network device (e.g., network device (100)).

In one embodiment of the disclosure, the external server(s) (e.g., 110) is a physical or virtual device that may be used for facilitating various embodiments of the disclosure. The physical device may correspond to any physical system with functionality to implement one or more embodiments of the disclosure. For example, the physical device may be a computing device (i.e., a device with at least one or more processor(s), memory, and an operating system) that is directly or otherwise connected to a network device (e.g., the network device (100)).

In one or more embodiments of the disclosure, the external servers (110) host one or more web pages. These web pages are the target of the HTTP[S] requests issued by the host.

In one embodiment of the disclosure, the captive portal (e.g., 108) may be a web page (e.g., http://company.com), where a user may enter authentication credentials for allowing the user access to a network that is otherwise, at least in part, blocked to the user. The captive portal may be implemented with executable instructions (stored in a non-transitory computer readable medium (not shown)), which when executed, enable a processor (not shown) to implement a web page onto which a user may be authenticated. In another embodiment, the captive portal (108) may be executing on a host (see e.g., FIG. 5).

In one embodiment of the disclosure, the captive portal implements functionality for receiving user authentication credentials (e.g., username and password) from one of the hosts (102A, 102B) through the network device (100) and the network (106), and validating the received user authentication credentials against a database of captive portal authentications. That is, the captive portal identifies the authentication session through an authentication server (e.g., 104, in FIG. 1) and records the user authentication credentials. The captive portal may compare the user authentication credentials, received via a host (e.g., 102A, 102B), e.g., to an internal database of captive portal authentications. In response to a match determination between the user authentication credentials and the captive portal authentications, the captive portal may report successful user authentication to an authentication server (e.g., 104) and the user is ultimately granted access to a network. In response to finding no match between the user authentication credentials and the database of captive portal authentications, a user is blocked from full access to the network.

In one embodiment of the disclosure, the authentication server (e.g., 104, in FIG. 1) is a physical or virtual device that may be used for facilitating various embodiments of the disclosure. The physical device may correspond to any physical system with functionality to implement one or more embodiments of the disclosure. For example, the physical device may be a computing device (i.e., a device with at least one or more processor(s), memory, and an operating system) that is directly or operationally connected to a network device (e.g., 100) and a captive portal (e.g., 108).

In one embodiment of the disclosure, the authentication server (e.g., 104) includes executable instructions (stored in a non-transitory computer readable medium (not shown)), which when executed, upon successful completion of a user authentication session by a captive portal (e.g., 108), issues a Radius change of authorization (CoA) message to the network device to complete the authentication to enable unrestricted access to a previously restricted network. In another embodiment, a Radius Disconnect message may be used to disconnect the host and then given the host full access during re-authentication.

In one or more embodiments of the disclosure, the authentication server (104) may be implemented as any type of computing device (see e.g., FIG. 5) with functionality for performing the methods and embodiments of the disclosure. The authentication server (104) may authenticate a user in various manners including in accordance with the IEEE 802.1X protocol—Extensible Authentication Protocol over Local Area Network (EAPoL) or media access control address (MAC)-based authentication (e.g., via the remote authentication dial-in service (RADIUS) protocol) or both one after the other in case one of them fails. The authentication server (104) may implement further functionality such as initiating an authentication session to authenticate a host, providing an ACL to a network device (e.g., 100) to facilitate such authentication, and receiving authentication status from a captive portal (e.g., 108).

In one embodiment of the disclosure, the authentication server (104) includes executable instructions (stored in a non-transitory computer readable medium (not shown)), which when executed, enable the authentication server (104) to perform one or more methods described below (see e.g., FIGS. 3, 4A, 4B).

While FIG. 1 shows a particular system architecture, the disclosure is not limited to the system architecture shown in FIG. 1. For example, while FIG. 1 shows one authentication server, one captive portal, and one network device, implementations of the disclosure may include one or more of each of the aforementioned elements without departing from the disclosure.

Figure 2:
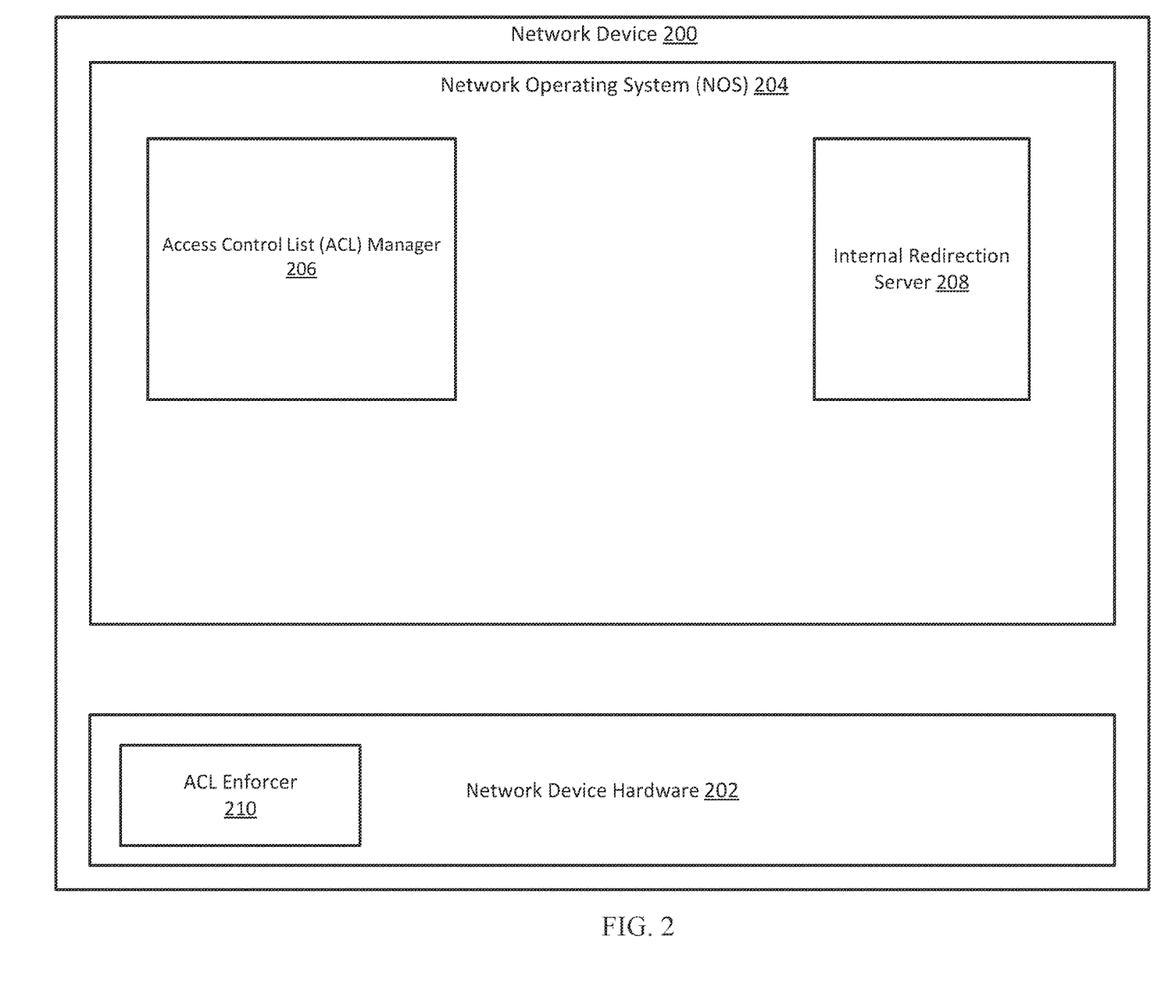
FIG. 2 shows a diagram of a network device in accordance with one or more embodiments of the disclosure.

FIG. 2 shows a network device in accordance with one or more embodiments of the disclosure. In one embodiment of the disclosure, a network device (200) includes network device hardware (202) and a network operating system (NOS) (204). In one embodiment of the disclosure, the network device (200) may correspond to the network device (100) of FIG. 1.

In one embodiment of the disclosure, the NOS (204) includes an access control list (ACL) manager (206) and an internal redirection server (208). In one embodiment of the disclosure, the network device hardware (202) includes an ACL enforcer (210). In one embodiment of the disclosure, the NOS (204) implements an operating system kernel with functionality to manage the operation of the network device (200). This functionality includes the software components (or modules) required to implement receiving and processing a unified ACL and to implement one or more components of the internal redirection server (208) as described throughout this disclosure. As a part of the processing, the NOS includes functionality to implement one or more protocols. Examples of protocols include, but are not limited to, Multi-Chassis Link Aggregation (MLAG), link aggregation groups (LAGs), Virtual Extensible Local Area Network (VXLAN), Link Layer Discovery Protocol (LLDP), tap aggregation, data center bridging capability exchange, Virtual Local Area Network (VLAN), Virtual Router Redundancy Protocol (VRRP), Virtual-Address Resolution Protocol (VARP), Spanning Tree Protocol (STP), Open Shortest Path First (OSPF), Border Gateway Protocol (BGP), Routing Information Protocol (RIP), Building Distribution Frame (BDF), Multi-Protocol Label Switching (MPLS), Protocol-Independent Multicast (PIM), Internet Control Message Protocol (ICMP), and Internet Group Management Protocol (IGMP).

Continuing with the discussion of FIG. 2, additional detail about each of the components illustrated in FIG. 2 is described below.

In one embodiment of the disclosure, the network device (200) includes executable instructions (stored in a non-transitory computer readable medium (not shown)), which when executed, enable the network device (200) to perform one or more methods described below (see e.g., FIGS. 3, 4A, 4B). In one embodiment, the network device (200) includes executable instructions, which when executed, enable the network device (200) to implement one or more components of the network device hardware (202) and the NOS (204).

In one embodiment of the disclosure, the NOS (204) includes executable instructions (stored in a non-transitory computer readable medium (not shown)), which when executed, enable the NOS (204) to perform one or more methods described below (see e.g., FIGS. 3, 4A, 4B). In one embodiment, the NOS (204) includes executable instructions, which when executed, enable a kernel (not shown) of the NOS (204) to implement an operating system that implements one or more components of the ACL manager (206) and the internal redirection server (208). Additional detail about the operation of the NOS is provided in FIGS. 3, 4A, 4B below.

In one embodiment of the disclosure, the ACL enforcer (210) implements functionality to match an incoming frame with the rules of a single unified ACL and implements the rules of the single unified ACL in a network device hardware (e.g., 202).

In one embodiment of the disclosure, the ACL enforcer (210) may be implemented using a ternary content-addressable memory (TCAM) in the network device hardware.

In one embodiment of the disclosure, the ACL enforcer (210) is a physical or virtual device that may be used for performing various embodiments of the disclosure. The physical device may correspond to any physical system with functionality to implement one or more embodiments of the disclosure. The physical device may be a special purpose computing device that includes one or more application-specific processor(s) (or hardware) configured to only execute embodiments of the disclosure. In such cases, the physical device may implement embodiments of the disclosure in hardware as a family of circuits and may retain limited functionality to receive input and generate output in accordance with various embodiments of the disclosure. In addition, such computing devices may use a state-machine to implement various embodiments of the disclosure.

In one embodiment of the disclosure, the ACL enforcer (210) includes executable instructions (stored in a non-transitory computer readable medium (not shown)), which when executed, enable the ACL enforcer (210) to perform one or more methods described below (see e.g., FIGS. 3, 4A, 4B). In one embodiment, the ACL enforcer (210) includes executable instructions, which when executed, enable the ACL enforcer (210) to implement the rules of a unified ACL on an incoming frame. Additional detail about the operation of the ACL enforcer is provided in FIGS. 3, 4A, 4B below.

In one embodiment of the disclosure, the ACL manager (206) may be one or more computing devices functionally equipped to facilitate receiving or generating a unified ACL, parsing ACL rules of the unified ACL, and providing the unified ACL rules to an ACL enforcer of a network device hardware of the network device (200).

In one embodiment of the disclosure, the ACL manager (206) is a physical or virtual device that may be used for performing various embodiments of the disclosure. The physical device may correspond to any physical system with functionality to implement one or more embodiments of the disclosure. The physical device may be a special purpose computing device that includes one or more application-specific processor(s) (or hardware) configured to only execute embodiments of the disclosure. In such cases, the physical device may implement embodiments of the disclosure in hardware as a family of circuits and may retain limited functionality to receive input and generate output in accordance with various embodiments of the disclosure. In addition, such computing devices may use a state-machine to implement various embodiments of the disclosure. Additional detail about the operation of the ACL manager is provided in FIGS. 3, 4A, 4B below.

In an embodiment of the disclosure, in addition to the ACL enforcer (210), the network device hardware (202) includes ports, one or more special purpose computing devices with functionality to receive an incoming frame from a host (e.g., 102A, . . . , 102B, FIG. 1), to permit or deny the incoming frame and/or redirect the host to a captive portal (e.g., 108, FIG. 1) under the direction of an ACL enforcer (e.g., 210) and to provide the incoming frame to a control plane (e.g., the operating system kernel of the network operating system) for further processing (see e.g., FIGS. 3, 4A, 4B). The special purpose hardware may be, for example an application-specific integrated circuit (ASIC) (not shown).

In an embodiment of the disclosure, the network device hardware (202) receives an incoming frame from a host, such as one of the hosts, through an ingress port of the network device (200) (not shown), and forwards the incoming frame to a network operating system (e.g., 204) for further processing. In an embodiment of the disclosure, the network device hardware (202) programs a TCAM based on the unified ACL rules and forwards an outgoing frame with a redirect response through an egress port (not shown) of the network device (200) to the host. Additional detail about the operation of the network device hardware is provided in FIGS. 3, 4A, 4B below.

In one embodiment of the disclosure, the internal redirection server (208) of the NOS is a virtual device that may be used for facilitating performing various embodiments of the disclosure.

In one embodiment of the disclosure, the internal redirection server includes executable instructions (stored in a non-transitory computer readable medium (not shown)), which when executed, enable the redirection server to perform or assist in performing one or more methods described below (see e.g., FIGS. 3, 4A, 4B).

In one or more embodiments of the disclosure, the internal redirection server (208) may be implemented as any type of server with functionality for receiving a request payload from an operating system kernel, generating and transmitting a redirect response to the operating system kernel. For example, consider the scenario where the request payload is an arbitrary web address. The internal redirection server (208) generates the redirect response (e.g., HTTP[S] 302 redirect) to the request payload, which includes a captive portal uniform resource locator (URL). Additional detail about the operation of the internal redirection server is provided in FIGS. 3, 4A, 4B below.

One skilled in the art will recognize that the architecture of the network device is not limited to the components shown in FIG. 2. For example, the network devices may each include components not shown in FIG. 2 or include alternate or fewer components as those shown in FIG. 2. In another example, while the network device hardware (202) and the NOS (204) are shown as distinct components, network device hardware (202) may be part of the NOS (204).

FIG. 3 shows a flowchart describing a method for processing an incoming request frame, redirecting the request to a redirection server, and transmitting a redirection frame towards a host in accordance with one or more embodiments described herein. The method of FIG. 3 may be performed by, for example, a network device (e.g., 100, FIG. 1 or 200, FIG. 2). Other components illustrated in FIGS. 1-2 may perform or assist in performing the method of FIG. 3 without departing from the disclosure.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 302, the network device performs an initial EAPol or MAC-based authentication of a host (e.g., one of the hosts 102A-102N, in FIG. 1)—Phase I of the two-phase authentication process.

In step 304, upon successful completion of Phase I of the authentication process, the network device interacts with an authentication server (e.g., 104, FIG. 1) to obtain a unified ACL. The unified ACL may specify permit-type rules and deny-type rules. In some embodiments of the disclosure, the unified ACL includes a custom redirect rule that is one of the deny-type rules. In another embodiment, the custom redirect rule that is one of the permit-type rules.

In some embodiments of the disclosure, the network device generates the unified ACL and either the network device or another device configures the unified ACL in the authentication server. The unified ACL may be static or dynamic. In some embodiments of the disclosure, a system administrator may manually generate some or all of the unified ACL rules and configure the authentication server with the unified ACL. An example of a dynamic unified ACL is shown in FIG. 4B and discussed in further detail below. In some embodiments of the disclosure, the unified ACL is not provided by the authentication server and instead, the network device may be configured to use a default unified ACL, as further discussed below. In some embodiments of the disclosure, an ACL manager (e.g., 206, FIG. 2) of the NOS (e.g., 204, FIG. 2) of the network device may receive a unified ACL that is provided by an authentication server or generated, in part or in whole, locally to the network device.

In some embodiments of the disclosure, an ACL manager (e.g., 210, FIG. 2) of the network device may not have advance notice of a host seeking web authentication and only after being prompted by an authentication server accordingly, does the ACL manager become aware of the host seeking web authentication.

With continued reference to FIG. 3, in step 306, the network device programs an ACL enforcer (e.g., 210, FIG. 2) with the unified ACL. The unified ACL specifies permit-type rules and deny-type rules.

In step 308, the network device hardware (e.g., 202, FIG. 2) of the network device receives an incoming frame from a host (e.g., one of the hosts 102A-102N, in FIG. 1) specifying information associated with an external server. In some embodiments of the disclosure, the information associated with the external server is a web page URL (e.g., http://company.com) hosted by the external server, the target destination of the host. Specifically, the payload of the incoming frame specifies the external server URL. A user of the host has not been completely authenticated by the captive portal at the time when the incoming frame is received by the network device hardware. That is, at the time the network device receives the incoming frame from the host, Phase II of the two-step authentication process (e.g., user authentication) is not yet complete and a user of the host is unauthorized to access the entirety of a network requiring two-step authentication.

The incoming frame is trapped by the network device hardware of the network device based on satisfying certain policies. For example, the incoming frame may be trapped based on one or more permit and deny rules of a unified ACL. In one embodiment, a payload of the incoming frame is an HTTP[S] request to access a web page hosted by any external server.

In step 310, the ACL enforcer matches the incoming frame (or incoming network traffic) to a custom redirect rule of the unified ACL. In some embodiments, the ACL enforcer may compare the incoming network traffic with any of deny-type rules in the unified ACL, except the custom redirect rule in the unified ACL, for a match and if a match is detected, the network device hardware may drop the incoming network traffic. In some embodiments there may be multiple custom redirect rules and, in such embodiments, the ACL enforcer may compare the incoming network traffic with any of deny-type rules in the unified ACL, except the custom redirect rules in the unified ACL, for a match and if a match is detected, the network device hardware may drop the incoming network traffic In some embodiments, the permit-type rules of the unified ACL comprise a permit-type rule that allows matching incoming network traffic to access one or more pre-defined websites (e.g., http//company.com).

In one embodiment of the disclosure, the ACL enforcer includes a ternary content-addressable memory (TCAM) and the custom redirect rule is programmed into the TCAM by the ACL enforcer. Indeed, in the foregoing embodiment, when any unified ACL rule matches the incoming frame, the matching rule may be programmed into the TCAM by the ACL enforcer. The custom redirect rule denies web traffic from the host while simultaneously redirecting the frame from the host towards the internal redirection server in the network device. In an embodiment of the disclosure, the custom redirect rule results from enhanced ACL grammar that natively includes a redirection option to enable a frame to be redirected to the internal redirection server. An example of a custom redirect rule is provided in FIG. 4B and discussed below. While the aforementioned embodiment discusses a TCAM, the disclosure is not limited to an ACL enforcer that is a TCAM.

At step 312, in response to a match between the incoming frame and the custom redirect rule of the unified ACL, the network device forwards at least a portion of the incoming frame towards a redirection server internal to the network device (e.g., 208, FIG. 2). Specifically, in step 312, the payload of the incoming request frame is forwarded towards the internal redirection server in the NOS (e.g., 204, in FIG. 2) of the network device for further processing. The redirection server processes the payload to generate a redirect response. That is, a response payload of the redirection frame is generated by the redirection server using at least a portion of the incoming frame (e.g., a request payload of the incoming frame). In an embodiment of the disclosure, the redirect response may be generated in accordance with the HTTP/1.0 specification and specify response status code "302" and the URL of the captive portal. The redirect response is not limited to the HTTP code 302 and can be other available redirection codes in accordance with the HTTP/1.1 (e.g., codes 303, 307) that may be utilized with a corresponding HTTP server.

In step 314, the network device hardware receives a redirection frame. The redirection frame has a packaged payload, which includes the redirect response generated by the internal redirection server.

In step 316, the network device transmits the redirection frame towards the host for consummating Phase II of the authentication process. At a later point in time, e.g., after the user has successfully completed web authentication via the captive portal, the unified ACL may be removed from the network device (e.g., in response to receiving a CoA message or disconnect message from the authentication server). Alternative, or additionally, another unified ACL may be programmed in the ACL enforcer, for example, based on a system administrator's choice, thereby replacing the unified ACL of FIG. 3.

EXAMPLE

The following description includes numbers in brackets, e.g., "[1]". These numbers represent an ordered sequence of steps that are performed in the non-limiting example below. The location of the corresponding circled numbers in FIGS. 4A-4B indicate, e.g., the location in the system in which the particular step is being performed.

Turning to the example, with reference to FIGS. 4A and 4B, consider a scenario in which a network device (400) consummates a two-phase web authentication of a host (402) desirous of reaching a website (i.e., a website that cannot be accessed until a user successfully completes the web authentication). At a first phase of the two-phase authentication process [1], the host is authenticated one of two ways, through the IEEE 802.1X protocol or a media access control (MAC) address-based authentication process by an authentication server, such as an authentication server (404). The authentication server (404) may be configured as an Authentication, Authorization, and Accounting Server (AAA Server) in some embodiments of the disclosure.

Prior to phase two of the authentication process, based on one or more rules of the exemplary unified ACL of FIG. 4B, the network device (400) may allow certain web traffic originating from the host (402) therefore permitting the host (402) to reach certain but not all websites. For example, the host (402) may be permitted to reach certain websites internal to an organization while the host (402) may be denied access to certain other websites external to the organization. Such permissions and denials may be part of the unified ACL.

With reference to the example unified ACL of FIG. 4B, the exemplary unified ACL, named "ip access-list unifiedacl", includes a list of rules stated in a sequence of command lines, starting from 10 and incrementing by 10 (e.g., 10, 20, 30, 40, 50, 60, and 70). For example, the command line "30 permit ip any intranetwebsite1.com" permits traffic to "intranetwebsite1.com". The sequence numbers, 10, 20, 30, 40, 50, 60, and 70, of the example unified ACL of FIG. 4B may be a set of default sequence numbers that are used when the network device is not configured with another set of sequence of numbers. For example, in the case where the unified ACL includes dynamic ACL rules and is generated internally to the network device, the sequence numbers may be the default sequence numbers. On the other hand, in the case where the unified ACL is received from an authentication server (e.g., 104, FIG. 1) and the unified ACL includes static ACL rules (static ACL name) and pre-configured on the network device, the sequence numbers of the unified ACL are as pre-configured.

In each command line of the exemplary unified ACL, the action to be performed on a port (e.g., "permit" or "deny") is followed by an Internet Protocol (IP) address, a source address, a destination address, and a port number(s). Accordingly, the source and destination addresses "any any" refer to any source ports and any destination ports of the network device. The command line "50 permit udp any any 53,67" facilitates domain name system (DNS) resolution of the domain name which the host (402), in FIG. 4A, is desirous of reaching, for example, company.com, such that the host (402) is provided with the IP address associated with the domain name Each of the command lines "10 permit ip any captiveportal1.com" and "20 permit ip any captiveportal2.com", when implemented by an ACL enforcer, such as the ACL enforcer (416) of FIG. 4A, allow reaching a captive portal server. Specifically, "10 permit ip any captiveportal1.com" allows traffic to the "captiveportal1.com" server and "20 permit ip any captiveportal2.com" allows traffic to the "captiveportal2.com" server. Use of two captive portal servers, i.e., captiveportal1.com and captiveportal2.com may help with load balancing. The command line "60 deny tcp any any eq www copy captive-portal" is an example of a custom redirect rule that enables traffic from all source and destinations matching port 80 (denoted as "www" in the unified ACL) to be forwarded to an internal redirection server (e.g., 404) in the network device for processing.

Continuing with the example in FIG. 4A, upon successful authentication at phase one of the authentication process, at [2] of FIG. 4A, an ACL manager (412) of a network operating system (NOS) (408) of the network device (400) requests web authentication from the authentication server (404). The authentication server (404) responds at the end of the first phase of authentication with a unified ACL (e.g., the exemplary unified ACL of FIG. 4B) previously configured as a part of a profile in the authentication server (404). The unified ACL is a single ACL conveniently combining permit-deny restriction rules as well as express redirect rules, such as described above.

The ACL manager (412) of the network device (400) may parse the ACL rules and at [3] and provide the unified ACL rules to an ACL enforcer (416) (e.g., a TCAM) of a network device hardware (410) of the network device (400). The ACL enforcer (416) matches the rules of the unified ACL with incoming frames, implementing the ACL rules of the single unified ACL in the network device hardware (410).

At [4], the ACL enforcer (416) receives an incoming frame from the host (402). The incoming frame includes a payload specifying an external server URL (e.g., http://company.com) that the host (402) wishes to reach. The host (402) cannot reach the external server at this time given the lack of successful phase two authentication. The ACL enforcer (416) therefore matches the incoming frame to a custom redirect rule (e.g., "60 deny tcp any any eq www copy captive-portal"). In response to the matching, the ACL enforcer forwards the request of the incoming frame towards an internal redirection server (414), at [5].

In response to the request, at [6], the network device (400) transmits to the host (402), a redirection response, obtained from an internal redirection server (414), which has the URL of the captive portal (406), as a payload packaged into a redirection frame by the network device (400). In one or more embodiments, the URL of the captive portal may be locally configured on the network device or may be obtained from the authentication server.

At [7], the ACL enforcer (416) receives a frame from the host (402) directed to the captive portal (406), which the ACL enforcer (416) consummates, at [8], by matching the frame, at [7], with the rule in one of the command lines: (a) "10 permit ip any captiveportal1.com" or (b) "20 permit ip any captiveportal2.com" in FIG. 4B. At the captive portal (406), the host (402) may authenticate a user and complete phase two of the authentication process by providing authentication credentials of the user at the captive portal (406). The captive portal (406) verifies the user credentials with the authentication server (404) and upon validation by the authentication server (404), the host (402) is allowed to access the external server (e.g., company.com).

End of Example

Figure 5:
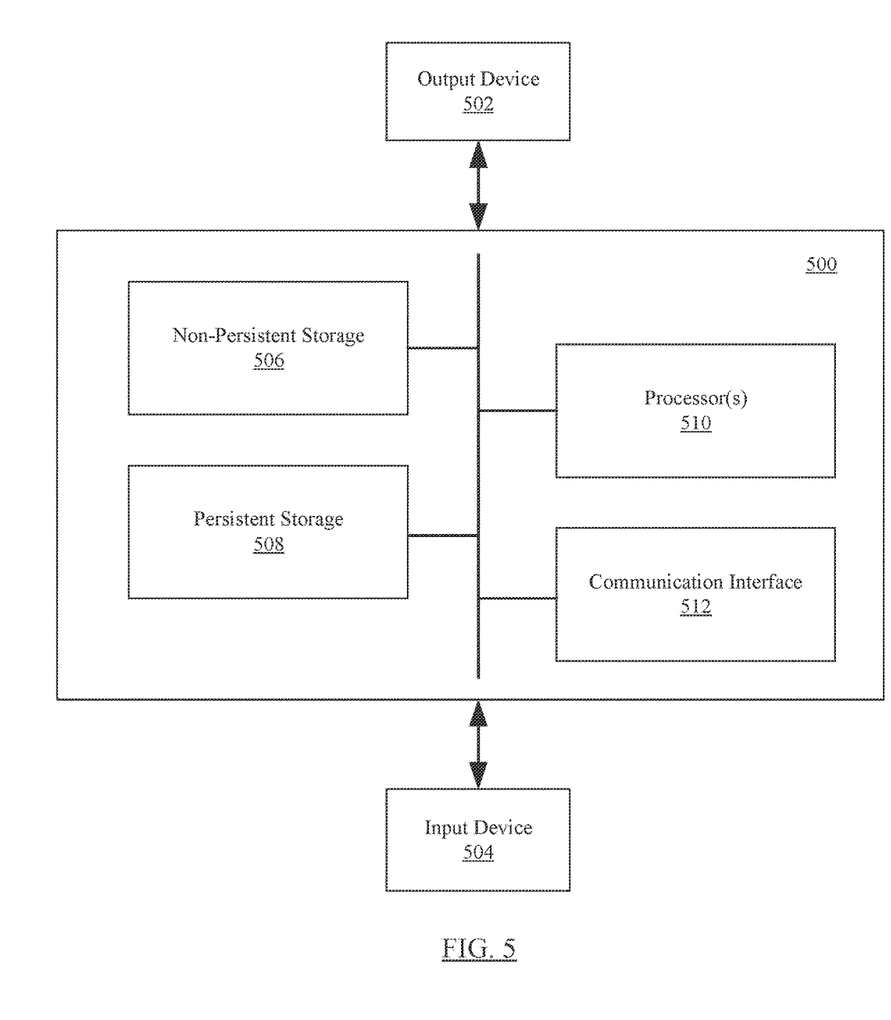
FIG. 5 shows an example host in accordance with one or more embodiments of the disclosure.

As discussed above, embodiments of the disclosure may be implemented using computing devices. FIG. 5 shows a diagram of a computing device in accordance with one or more embodiments of the disclosure. The computing device (500) may implement an embodiment of a host (e.g., (102A, 102B), in FIG. 1). The computing device (500) may include one or more computer processors (510), non-persistent storage (506) (e.g., volatile memory, such as random access memory (RAM), cache memory), persistent storage (508) (e.g., a hard disk, an optical drive such as a compact disk (CD) drive or digital versatile disk (DVD) drive, a flash memory, etc.), a communication interface (512) (e.g., Bluetooth® interface, infrared interface, network interface, optical interface, etc.), input devices (504), output devices (502), and numerous other elements (not shown) and functionalities. Each of the components illustrated in FIG. 5 is described below.

In one embodiment of the disclosure, the computer processor(s) (510) may be an integrated circuit for processing instructions. For example, the computer processor(s) may be one or more cores or micro-cores of a processor. The computing device (500) may also include one or more input devices (504), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the disclosure, the computing device (500) may include one or more output devices (502), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (510), non-persistent storage (506), and persistent storage (508). Many different types of computing devices exist, and the aforementioned input and output device(s) may take other forms.

Specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for redirecting, by a network device, a host to a captive portal, the method comprising:
    prior to receiving an incoming frame, obtaining, by an access control list (ACL) manager, a unified ACL from an authentication server;
    programming, using the unified ACL, a custom redirect rule on an ACL enforcer in network device hardware;
    receiving, by network device hardware of the network device, the incoming frame originating from the host, wherein the incoming frame comprises a payload specifying information associated with an external server, wherein a user of the host has not been authenticated by the captive portal at a time when the incoming frame is received by the network device hardware;
    matching, by the network device hardware, at least a portion of the incoming frame to a custom redirect rule of the unified ACL implemented in the network device hardware;
    in response to the matching, forwarding, by the network device hardware, the incoming frame towards an internal redirection server executing on the network device, wherein the custom redirect rule prevents the incoming frame from being forwarded towards the external server and simultaneously redirects the incoming frame to the internal redirection server;
    receiving, by the network device hardware, a redirection frame, wherein a payload of the redirection frame is generated by the internal redirection server using at least a portion of the incoming frame; and
    transmitting the redirection frame towards the host.

2. The method of claim 1, further comprising:
    performing MAC-based authentication or EAPoL authentication of the host prior to the ACL manager receiving the unified ACL.

3. The method of claim 1, wherein the ACL enforcer comprises a ternary content-addressable memory (TCAM) and wherein the custom redirect rule is programmed into the TCAM.

4. The method of claim 1, wherein the unified ACL includes permit-type rules and deny-type rules.

5. The method of claim 4, wherein the custom redirect rule is one of the deny-type rules.

6. The method of claim 5, wherein incoming network traffic that matches any of deny-type rules, except the custom redirect rule, is dropped by the network device hardware.

7. The method of claim 4, wherein the permit-type rules comprise a permit-type rule that allows matching incoming network traffic to access pre-defined websites.

8. The method of claim 1, wherein the redirection frame includes a redirection response that specifies a uniform resource locator (URL) for the captive portal.

9. The method of claim 8, wherein the payload of the incoming frame specifies a uniform resource locator (URL) for an external server to which the host is requesting access.

10. A network device, comprising:
    network device hardware comprising a processor; and
    memory comprising instructions which, when executed by the processor, perform a method, the method comprising:
    prior to receiving an incoming frame, obtaining, by an access control list (ACL) manager, a unified ACL from an authentication server;

programming, using the unified ACL, a custom redirect rule on an ACL enforcer in network device hardware;

receiving, by network device hardware of the network device, the incoming frame originating from the host, wherein the incoming frame comprises a payload specifying information associated with an external server, wherein a user of the host has not been authenticated by the captive portal at a time when the incoming frame is received by the network device hardware;

matching, by the network device hardware, at least a portion of the incoming frame to a custom redirect rule of the unified ACL implemented in the network device hardware;

in response to the matching, forwarding, by the network device hardware, the incoming frame towards an internal redirection server executing on the network device, wherein the custom redirect rule prevents the incoming frame from being forwarded towards the external server and simultaneously redirects the incoming frame to the internal redirection server;

receiving, by the network device hardware, a redirection frame, wherein a payload of the redirection frame is generated by the internal redirection server using at least a portion of the incoming frame; and transmitting the redirection frame towards the host.

11. The network device of claim 10, further comprising:
performing MAC-based authentication or EAPoL authentication of the host prior to the ACL manager receiving the unified ACL.

12. The network device of claim 10, wherein the ACL enforcer comprises a ternary content-addressable memory (TCAM) and wherein the custom redirect rule is programmed into the TCAM.

13. The network device of claim 10, wherein the unified ACL specifies permit-type rules and deny-type rules.

14. The network device of claim 13, wherein the custom redirect rule is one of the deny-type rules.

15. The network device of claim 14, wherein incoming network traffic that matches any of deny-type rules, except the custom redirect rule, is dropped by the network device hardware.

16. A non-transitory computer readable medium comprising computer readable program code, which when executed by a processor enables the processor to perform a method, the method comprising:

prior to receiving an incoming frame, obtaining, by an access control list (ACL) manager, a unified ACL from an authentication server;

programming, using the unified ACL, a custom redirect rule on an ACL enforcer in network device hardware;

receiving, by network device hardware of the network device, the incoming frame originating from the host, wherein the incoming frame comprises a payload specifying information associated with an external server, wherein a user of the host has not been authenticated by the captive portal at a time when the incoming frame is received by the network device hardware;

matching, by the network device hardware, at least a portion of the incoming frame to a custom redirect rule of the unified ACL implemented in the network device hardware;

in response to the matching, forwarding, by the network device hardware, the incoming frame towards an internal redirection server executing on the network device, wherein the custom redirect rule prevents the incoming frame from being forwarded towards the external server and simultaneously redirects the incoming frame to the internal redirection server;

receiving, by the network device hardware, a redirection frame, wherein a payload of the redirection frame is generated by the internal redirection server using at least a portion of the incoming frame; and transmitting the redirection frame towards the host.

* * * * *